United States Patent Office 2,776,199
Patented Jan. 1, 1957

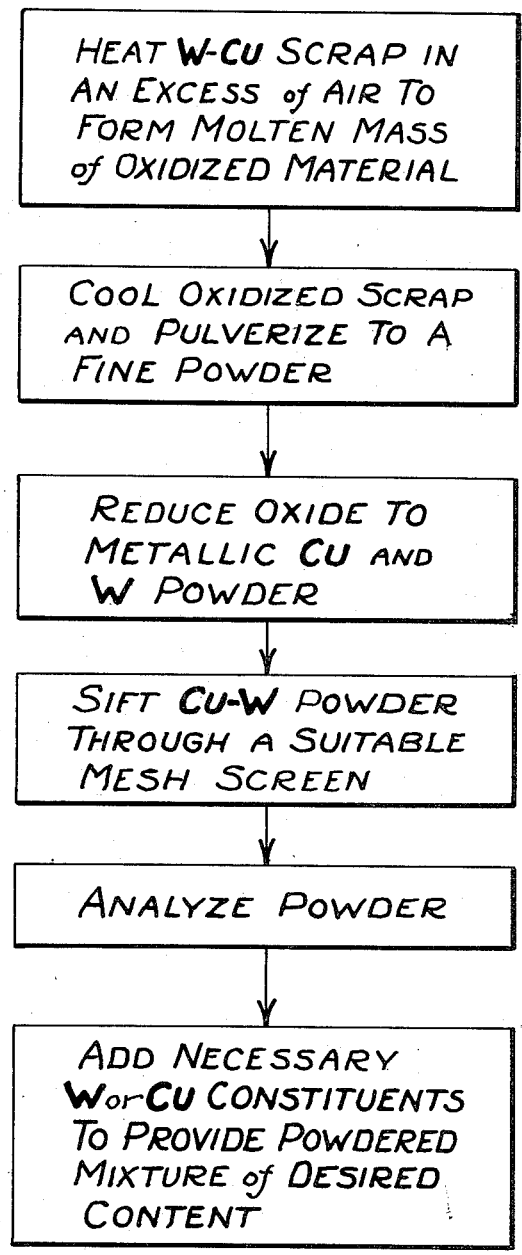

2,776,199

RECOVERY OF TUNGSTEN AND COPPER SCRAP

Columbus Verdi, Waukegan, Ill., assignor to Fansteel Metallurgical Corporation, a corporation of New York Application November 30, 1953, Serial No. 395,209

17 Claims. (Cl. 75—.5)

This invention relates to a method for the recovery of tungsten and copper from a sintered tungsten-copper scrap.

In the manufacture of tungsten contact buttons and other tungsten-bearing materials, a mixture of tungsten and copper is used in a wide number of applications. This mixture of the two metals in powdered form is sintered to form the contact material. Generally, the amount of tungsten used is in excess of copper, the usual proportions being in the ratio of about two parts by weight of tungsten to one part of copper. However, other proportions, as will hereinafter appear, may be used. In some instances, other metals such as nickel or iron, for example, may be present, these additional metals being present in small amounts. These and other metals or compounds are sometimes added to the tungsten-copper mixture to form contact buttons.

In the manufacture of such tungsten-copper sintered material, a certain amount of scrap naturally occurs. Because of the tungsten content of this scrap, a substantial salvage value is present.

Scrap in the form of shavings or particles of tungsten and copper sintered material has not been susceptible to economical salvage. The malleability of the scrap makes it difficult to crush or pulverize for powder treatment. This invention makes it possible to salvage in an economical manner the sintered tungsten and copper scrap, and particularly the scrap in small pieces which have hitherto been difficult to process. While the invention is applicable to the salvage of sintered tungsten-copper scrap in substantial size, its principal field of utility lies in the salvage of scrap in the nature of chips, turnings, ends of bars and the like.

The scrap after recovery is in a powdered form wherein only the proportion of tungsten to copper might require adjustment in order to render such recovered scrap directly usable to form sintered tungsten-copper contact buttons and the like. This invention provides an auxiliary cycle in the manufacture of sintered tungsten-copper contact material, said cycle beginning with the creation or formation of the tungsten-copper scrap and ending with the initial steps in conventional processes for making such contact material.

The new method is based upon a reaction involving tungsten-copper sintered material wherein the resulting material is a homogeneous liquid. I have discovered that if a mass of sintered tungsten-copper material is heated in an excess of air at a temperature of at least 600° C., that the originally sintered tungsten and copper material will become a homogeneous liquid which will solidify on cooling to a brittle, friable material. This friable material is susceptible to simple treatment thereafter for obtaining a mixture of powdered tungsten and copper.

In order that the invention may be fully understood, it will now be explained in connection with the drawing wherein a block diagram illustrating the various steps in the method is shown.

The new recovery method starts with a quantity of sintered tungsten and copper scrap. This tungsten and copper scrap may have a substantial range of proportions of the two metals. It is preferred, however, to have a substantial excess of tungsten over copper by weight; a preferred range of proportions is between about 65 and 70% by weight of tungsten and between about 35 and 30% by weight of copper. However, the range of tungsten may extend from about 50% to about 80% by weight, and the range of copper may extend from about 50% to 20% by weight. Small amounts of metals, for example nickel, cobalt and iron, and refractory metals such as molybdenum up to about 1% by weight, may be tolerated without substantial impairment of the efficacy of the salvage process. In the case of nickel, for example, up to as much as about 1% by weight may be tolerated, but it is preferred that the nickel content not exceed 0.5%. In the case of other metals, the tolerable percentage is of about the same order. Here, again, it is preferred that these other metals not exceed 0.5%. Where nickel is present in an amount of up to 0.5%, other metals may also be present, but in amounts not exceeding about 0.5%, preferably about 0.25%.

The scrap is most conveniently treated by the process of the present invention when in a form where the ratio of surface to mass is quite large. This, of course, is true where the material is in the form of chips, turnings, or ends of bars. The scrap material is placed in a suitable inert refractory vessel such as a crucible of ceramic, quartz, or any other material which is inert to the tungsten and copper under operating conditions.

The scrap material is heated to a temperature of at least 600° C. but below the melting point of copper. In practice, the scrap is heated to a temperature of between about 600° C. and 1063° C. (the melting point of copper), preferably to about 900° C. The heating of the tungsten-copper scrap is done with an excess of air. To accelerate the oxidation of these two metals, a blast of air may be introduced into or over the material.

In the course of this oxidation treatment, compounds containing tungsten and copper are formed, which compounds melt in the temperature range previously specified to form a liquid mass. The liquid containing the scrap tungsten and copper will settle to the bottom of the vessel or crucible. When a sufficient quantity of the liquid has been formed, it is separated from the scrap as by pouring the liquid into a second crucible or mold of suitable material for cooling. This second mold may conveniently be of graphite, although other materials such as cermaic or quartz may be used.

When the liquid mass has cooled to form a casting, it can be removed from the mold. The casting is brittle and friable. The casting is pulverized by conventional means, such as for example a ball mill, until a fine powder is produced. The fineness of the powder is unimportant within wide limits and, in practice, may vary from about 30 mesh up to about 325 mesh. The pulverizing may be continued until a powder of generally uniform fineness may result. If desired, the pulverized material may be sifted through a screen somewhat finer than 30 mesh so that substantially all pulverized material finer than a predetermined mesh will be passed for subsequent treatment. The coarser component of the pulverized material may be returned for further pulverizing. Thus, a convenient screen to use may have a mesh size of about 48. However, it is to be understood that all of the pulverized material ranging from about a 30 mesh up to about 325 mesh and finer may be used for subsequent salvage operation.

The pulverized material is next placed in a boat or vessel of material inert under operating conditions such as, for example, a boat of Monel metal, molybdenum, or stainless steel. The pulverized material is then heated while in the boat and simultaneously subjected to a reducing atmosphere. The temperature to which the material is heated will depend in some measure upon the character of the reducing atmosphere and upon the exact composition of the tungsten and copper material. In general, however, the temperature, for reducing purposes, may have a range of from about 700° to about 875° C. A particularly effective temperature range is from about 800° C. to about 850° C. with an atmosphere of hydrogen. It is understood, however, that other reducing atmospheres, such as dissociated ammonia gas, for example, may be used.

The reduction is carried on otherwise in a conventional manner with the reducing atmosphere being supplied to the hot pulverized material at a rate so that substantially complete reduction of the pulverized material results. The reduced material is a powder consisting of metallic tungsten and copper. The proportion is not necessarily the same as the original scrap material. The material may be sifted through a suitable screen in preparation for reusing the metallic tungsten and copper. Thus, the reduced powdered material may be passed through a screen having a mesh of about 200, although any desired mesh size may be used depending upon the specifications of the sintering ingredients.

There is now present a quantity of tungsten and copper in finely divided form having desired particle size and ready to be used as a raw material. A determination of the proportion by weight of tungsten and copper may now be made, and sufficient tungsten or copper in suitably fine form is added to the salvaged material to bring the proportions to the desired values for making contact buttons or other devices. Preferably, the pulverized material prior to reduction is analyzed and sufficient tungsten or copper in the form of the oxide is added to the pulverized material to bring the components to values so that after reduction the metals are in the desired portions for making the contact button or other device. Additional ingredients may be added, if desired, prior or subsequent to the reduction treatment, as desired.

As one example, I have successfully treated scrap wherein the tungsten content by weight was 64.35%, the copper content was 35% and the nickel content was 0.65%. The scrap, in the form of chips or turnings, was heated in a crucible to about 900° C., the heated material being subjected to a gentle blast of air. The resulting reaction caused a liquid to form and settle to the bottom of the crucible in which the scrap was being heated. When about one-third of the crucible had been filled with the liquid, the liquid was poured into a graphite mold and allowed to solidify in air. The casting was removed from the mold and pulverized until the cast material had a fineness of between about 30 mesh and about 325 mesh size. The pulverized material was placed in a Monel metal bolt and heated to a temperature of 825° C. in a stream of hydrogen. After reduction was complete, the resulting powder was a mixture of metallic tungsten and metallic copper containing approximately the same amount of nickel which was originally present, with no appreciable pickup of other impurities from the refractory crucible, and could be handled as a conventional mixture of powdered tungsten and copper for sintering or other purposes.

What is claimed is:

1. A method of reclaiming scrap consisting essentially of sintered tungsten and copper where the tungsten comprises at least one-half of the total weight of the tungsten and copper and wherein other materials constitute from zero percent to less than about 1.0 percent by weight, said method comprising heating said scrap material in an excess of air to a temperature below the melting point of the copper but sufficiently high to form a liquid containing both tungsten and copper, separating said liquid from the remainder of the scrap material and cooling the same so that a brittle, friable solid is formed, pulverizing said friable solid and heating the pulverized material in a reducing atmosphere to form a mixture of metallic tungsten and copper powders.

2. The method according to claim 1 wherein the scrap contains between about 50% and 80% by weight of tungsten and between about 50% and 20% by weight of copper and wherein nickel is present in an amount of from zero to about 1.0 percent by weight.

3. The method according to claim 2 wherein said scrap material is heated in an excess of air to a temperature of between about 600° C. and 1063° C.

4. The method according to claim 3 wherein the pulverized material is heated to a temperature of between about 700° and 850° C. in a stream of hydrogen for reducing.

5. A method of reclaiming scrap consisting of sintered tungsten and copper where the tungsten comprises between about 65% and 70% by weight and the copper comprises between about 35% and 30% by weight, said method comprising placing said scrap in a refractory boat of material inert to the tungsten and copper under operating conditions, heating said scrap in an excess of air to a temperature of about 900° C. to form a liquid containing both tungsten and copper, separating said liquid from the remainder of the scrap material and cooling the same so that a brittle, friable solid is formed, pulverizing said solid and heating the pulverized material in a reducing atmosphere to form a powdered mixture of metallic tungsten and copper powders.

6. The method according to claim 5 wherein said pulverized material is heated to a temperature of between about 800° and 850° C. in an atmosphere of hydrogen.

7. A method of reclaiming scrap consisting essentially of sintered tungsten and copper where the tungsten comprises between about 65% and 70% by weight and the copper comprises between about 35% and 30% by weight and where nickel is present in an amount of from zero to less than about 1.0 percent by weight, said method comprising placing the scrap in a boat of a material inert to the tungsten and copper under oxidizing conditions at the operating temperature, heating said scrap in said boat to a temperature above about 600° C. and below the melting point of copper, said hot scrap being heated in an excess of air to form a liquid containing both tungsten and copper, separating said liquid from the remainder of the scrap material and cooling the same so that a brittle, friable solid is formed, pulverizing said friable solid, disposing the pulverized material in a boat of material inert to the pulverized material and stable under elevated temperatures under reducing conditions and heating said pulverized material in a reducing atmosphere to reduce the material to tungsten and copper powders.

8. The method according to claim 7 wherein said pulverized solid material is screened to eliminate relatively coarse particles of material.

9. A method of reclaiming scrap consisting of sintered tungsten and copper where the tungsten comprises at least 50% of the material by weight and substantially all of the remainder is copper, said method comprising heating said scrap in an excess of air to a temperature above about 600° C. and below the melting point of copper until a liquid containing both tungsten and copper is formed, separating the liquid from the scrap, cooling the liquid to form a brittle, friable solid, pulverizing said solid and reducing said pulverized material to form tungsten and copper powders.

10. A method of reclaiming scrap in finely divided form consisting of sintered tungsten and copper with the tungsten forming at least 50% by weight of the sintered material and substantially all of the remainder being copper, said method comprising heating said scrap material in an excess of air to a temperature of between about 600° C. and the melting point of copper to form a liquid containing tungsten and copper, separating said liquid from other material, cooling the liquid to form a brittle, friable solid, pulverizing said friable solid and thereafter subjecting said pulverized material to a reducing process to form tungsten and copper powders.

11. The method according to claim 10 wherein said scrap contains between about 65% and 70% of tungsten and the copper comprises between about 35% and 30% and where nickel is present in an amount less than about 1%.

12. The method according to claim 11 wherein nickel is present in the scrap in an amount of about 0.5% and wherein other metals are present in an amount of not more than about 0.25%.

13. The method according to claim 10 wherein said scrap is heated to a temperature of about 900° C.

14. The method according to claim 13 wherein the pulverized material is reduced at a temperature of between about 800° and 850° C.

15. A method of reclaiming scrap consisting essentially of sintered tungsten and copper where the tungsten comprises at least one-half of the total weight of the tungsten and copper and wherein other materials constitute from zero percent to less than about 1.0 percent by weight, said method comprising heating said scrap material in an excess of air to a temperature below the melting point of the copper but sufficiently high to form a liquid containing both tungsten and copper, separating said liquid from the remainder of the scrap material and cooling the same so that a brittle, friable solid is formed, and heating said friable solid in a reducing atmosphere to form a mixture of metallic tungsten and copper powders.

16. A method of reclaiming scrap consisting of sintered tungsten and copper where the tungsten comprises between about 65% and 70% by weight and the copper comprises between about 35% and 30% by weight, said method comprising placing said scrap in a refractory boat of material inert to the tungsten and copper under operating conditions, heating said scrap in an excess of air to a temperature of about 900° C. to form a liquid containing both tungsten and copper, separating said liquid from the remainder of the scrap material and cooling the same so that a brittle, friable solid is formed, and heating the friable solid in a reducing atmosphere to form a powdered mixture of metallic tungsten and copper powders.

17. A method of reclaiming scrap consisting of sintered tungsten and copper where the tungsten comprises at least 50% of the material by weight and substantially all of the remainder is copper, said method comprising heating said scrap in an excess of air to a temperature above about 600° C. and below the melting point of copper until a liquid containing both tungsten and copper is formed, separating the liquid from the scrap, cooling the liquid to form a brittle, friable solid, and reducing said friable solid to form tungsten and copper powders.

References Cited in the file of this patent
UNITED STATES PATENTS
1,081,568    Becket _____ Dec. 16, 1913